US012795425B2

(12) United States Patent
Barbu et al.

(10) Patent No.: US 12,795,425 B2
(45) Date of Patent: Nov. 10, 2026

(54) POSITION REFERENCE SIGNAL TRANSMISSION

(71) Applicant: Nokia Technologies Oy, Espoo (FI)

(72) Inventors: Oana-Elena Barbu, Aalborg (DK); Ryan Keating, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 351 days.

(21) Appl. No.: 18/500,648

(22) Filed: Nov. 2, 2023

(65) Prior Publication Data

US 2024/0155401 A1 May 9, 2024

Related U.S. Application Data

(60) Provisional application No. 63/382,185, filed on Nov. 3, 2022.

(51) Int. Cl.
*H04W 24/10* (2009.01)
*H04L 5/00* (2006.01)
*H04W 64/00* (2009.01)

(52) U.S. Cl.
CPC ........... *H04W 24/10* (2013.01); *H04L 5/0048* (2013.01); *H04W 64/00* (2013.01)

(58) Field of Classification Search
CPC ................. H04W 24/10; H04W 64/00; H04W 72/232; H04W 72/0446; H04W 72/1263;
(Continued)

(56) References Cited

U.S. PATENT DOCUMENTS 9,572,063 B2 * 2/2017 Etemad ................. H04L 41/082
2020/0021409 A1 1/2020 Kumar et al.
(Continued)

FOREIGN PATENT DOCUMENTS

WO 2022/031889 A1 2/2022

OTHER PUBLICATIONS

"3rd Generation Partnership Project; Technical Specification Group Radio Access Network; NR; Physical layer procedures for data (Release 17)", 3GPP TS 38.214, V17.3.0, Sep. 2022, pp. 1-232.
(Continued)

*Primary Examiner* — Wei Zhao
(74) *Attorney, Agent, or Firm* — Carter, DeLuca & Farrell LLP

(57) ABSTRACT

In accordance with example embodiments as disclosed herein there is at least an apparatus and method to perform receiving, from a network entity, a request for assessing utilization of a set of resource blocks outside a measurement gap of a terminal device; performing measurements indicative of the utilization of the set of resource blocks based on the request; and transmitting, to the network entity, a report of the measurements. Also perform indicating, to a network device, a set of resource blocks outside a measurement gap of a terminal device; obtaining, from the network device, information relating to channel occupancy on the set of resource blocks; and determining, based on the information, how to use the set of resource blocks for positioning of the terminal device. Further, to perform receiving, from a network entity, an indication indicating a set of resource blocks outside a measurement gap of a terminal device; and transmit, to the network entity, information relating to channel occupancy on the set of resource blocks.

1 Claim, 5 Drawing Sheets

(58) Field of Classification Search
CPC ............... H04W 72/23; H04W 72/044; H04W 72/126; H04L 5/0048; H04L 5/004
See application file for complete search history.

(56) References Cited

U.S. PATENT DOCUMENTS

| | | | | |
|---|---|---|---|---|
| 2021/0337377 | A1 | 10/2021 | Manolakos et al. | |
| 2022/0038902 | A1 * | 2/2022 | Mueck | H04L 63/1433 |
| 2022/0053450 | A1 | 2/2022 | Khoryaev et al. | |
| 2022/0086675 | A1 | 3/2022 | Manolakos et al. | |
| 2022/0191720 | A1 | 6/2022 | Cui et al. | |
| 2023/0269048 | A1 * | 8/2023 | Kumar | H04L 5/0051 370/329 |

OTHER PUBLICATIONS

"3rd Generation Partnership Project; Technical Specification Group Radio Access Network; LTE Positioning Protocol (LPP) (Release 17)", 3GPP TS 37.355, V17.1.0, Jun. 2022, pp. 1-345.
"Introduction of NR Positioning Enhancements", 3GPP TSG-RAN WG1 Meeting #107-e, R1-2112953, Nokia, Nov. 11-19, 2021, 8 pages.
"Introduction of NR positioning enhancements", 3GPP TSG RAN WG1 #107-e, R1-2112915, Intel Corporation, Nov. 11-19, 2021, 7 pages.
"Moderator's summary for discussion [RAN93e-R18Prep-10] Expanded and improved Positioning", 3GPP TSG RAN#93e, RP-211660, Agenda: 9.0.1, Intel, Sep. 13-17, 2021, pp. 1-67.
"Msc-generator", Sourceforge, Retrieved on Dec. 12, 2023, Webpage available at : https://sourceforge.net/projects/msc-generator/.
"3rd Generation Partnership Project; Technical Specification Group Radio Access Network; NR; Physical channels and modulation (Release 17)", 3GPP TS 38.211, V17.3.0, Sep. 2022, pp. 1-136.
"Clarification on PPW and MG configuration to the same UE and miscellaneous corrections", 3GPP TSG-RAN2 Meeting #118-e, R2-2205810, Ericsson, May 9-20, 2022, 4 pages.
Extended European Search Report received for corresponding European Patent Application No. 23204013.9, dated Mar. 26, 2024, 11 pages.
"Discussion on latency reduction for NR positioning", 3GPP TSG RAN WG1 #106b-e, R1-2108881, Agenda item: 8.5.4, ZTE, Oct. 11-19, 2021, pp. 1-13.
"Latency improvements for both DL and DL+UL positioning methods", 3GPP TSG-RAN WG1 Meeting #106-bis-e, R1-2110352, Agenda Item: 8.5.4, Ericsson, Oct. 11-19, 2021, pp. 1-6.
"FL summary #1 of 8.5.4 latency improvements for DL and DL+UL methods", 3GPP TSG-RAN WG1 Meeting #106b-e, R1-2110445, Agenda Item: 8.5.4, Huawei, Oct. 11-19, 2021, 28 pages.

* cited by examiner

POSITION REFERENCE SIGNAL TRANSMISSION

TECHNICAL FIELD

The teachings in accordance with the exemplary embodiments of this disclosure relate generally to enhancements of positioning protocols, more specifically, relate to enhancements of LTE positioning protocol and new radio positioning protocol annex that enables measurement gap-less positioning reference signal transmission.

BACKGROUND

This section is intended to provide a background or context to the disclosure that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

CAE carrier aggregation error
CC component carrier
IE Information Element
LMF location management function
LPP LTE Positioning Protocol
LTE long term evolution
NRPPa new radio positioning protocol annex
PM positioning measurement
PPW positioning processing window
PRS positioning reference signal
RB resource block
RSTD received signal time difference
TE timing Error
TEG timing Error Group
TOA time of arrival
TRP transmit receive point
UE user Equipment In standards around the time of this application it was agreed that the UE can measure the positioning reference signals (PRS) without a measurement gap (MG) i.e., perform what is called MG-less PRS measurement.

To measure the positioning reference signal (PRS) without a measurement gap (MG) it was agreed to have some conditions for:

1. when the UE can measure;
2. which TRP(s) the UE should measure; and
3. a PRS processing window.

Example embodiments as described herein work to improve operations to measure a PRS without a MG.

SUMMARY

This section contains examples of possible implementations and is not meant to be limiting.

In an example aspect of the disclosure, there is an apparatus, such as a terminal device apparatus comprising at least one processor; and at least one memory storing instructions that, when executed by the at least one processor, cause the apparatus at least to: receive, from a network entity, a request for assessing utilization of a set of resource blocks outside a measurement gap of the apparatus; perform measurements indicative of the utilization of the set of resource blocks based on the request; and transmit, to the network entity, a report of the measurements.

In another example aspect of the disclosure, there is a method comprising: receiving, at a terminal device and from a network entity, a request for assessing utilization of a set of resource blocks outside a measurement gap of the terminal device; performing measurements indicative of the utilization of the set of resource blocks based on the request; and transmitting, to the network entity, a report of the measurements.

A further example embodiment is an apparatus and a method comprising the apparatus and the method of the previous paragraphs, wherein there is receiving information indicating how to use the set of resource blocks for positioning of the apparatus, and to defer, based on the information, usage of the set of resource blocks for the positioning of the apparatus, wherein there is obtaining a positioning processing window; and receiving, a positioning reference signal on at least one physical resource block of the set of resource blocks within the positioning processing window, wherein the positioning processing window is configured by a network device for the apparatus, wherein there is transmitting, to the network device, a request for the positioning processing window, wherein there is receiving, from the network entity, information indicating how to use the set of resource blocks for positioning of the apparatus, and wherein the apparatus comprises a terminal device and/or the network entity comprises a location management entity.

A non-transitory computer-readable medium storing program code, the program code executed by at least one processor to perform at least the method as described in the paragraphs above.

In another example aspect of the disclosure, there is an apparatus comprising: means for receiving, from a network entity, a request for assessing utilization of a set of resource blocks outside a measurement gap of the apparatus; means for performing measurements indicative of the utilization of the set of resource blocks based on the request; and means for transmitting, to the network entity, a report of the measurements.

In accordance with the example embodiments as described in the paragraph above, at least the means for receiving, performing, and transmitting comprises a network interface, and computer program code stored on a computer-readable medium and executed by at least one processor.

In another example aspect of the disclosure, there is an apparatus, such as a location management function apparatus comprising at least one processor; and at least one memory storing instructions that, when executed by the at least one processor, cause the apparatus at least to: indicate, to a network device, a set of resource blocks outside a measurement gap of a terminal device; obtain, from the network device, information relating to channel occupancy on the set of resource blocks; and determine, based on the information, how to use the set of resource blocks for positioning of the terminal device.

In another example aspect of the disclosure, there is a method comprising: indicating, by a network entity and to a network device, a set of resource blocks outside a measurement gap of a terminal device; obtaining, at the network entity and from the network device, information relating to channel occupancy on the set of resource blocks; and determining, by the network entity, based on the information, how to use the set of resource blocks for positioning of the terminal device.

A further example embodiment is an apparatus and a method comprising the apparatus and the method of the previous paragraphs, wherein the channel occupancy on the set of resource blocks indicates traffic of one or more terminal devices scheduled by the network device on the set of resource blocks, wherein the information comprises at least one of: information indicative of locations of the one or more terminal devices, or traffic direction for the traffic of the one or more terminal devices scheduled by the network device on the set of resource blocks, or at least one of transmit power or link quality associated with the traffic of the one or more terminal devices scheduled by the network device on the set of resource blocks, or identities of the one or more terminal devices, wherein there is requesting the terminal device to perform measurements on the set of resource blocks, wherein there is receiving, from the terminal device, a report of the measurements, wherein there is deferring, based on the report, usage of the set of resource blocks for the positioning of the terminal device, wherein there is allowing or implementing, based on the report, partial utilization of the set of resource blocks comprising at least one of lowering the transmit power or using a subset of the set of resource blocks for the positioning of the terminal device, wherein there is implementing, based on the report, full power transmissions on the set of resource blocks for the positioning of the terminal device, wherein there is transmitting, to the network device, a transmission power per positioning reference signal resource, and wherein the apparatus comprises a location management entity.

A non-transitory computer-readable medium storing program code, the program code executed by at least one processor to perform at least the method as described in the paragraphs above.

In another example aspect of the disclosure, there is an apparatus comprising: means for indicating, to a network device, a set of resource blocks outside a measurement gap of a terminal device; means for obtaining, from the network device, information relating to channel occupancy on the set of resource blocks; and means for determining, based on the information, how to use the set of resource blocks for positioning of the terminal device.

In accordance with the example embodiments as described in the paragraph above, at least the means for indicating, obtaining, and determining comprises a network interface, and computer program code stored on a computer-readable medium and executed by at least one processor.

In another example aspect of the disclosure, there is an apparatus, such as a base station or gNB type apparatus comprising at least one processor; and at least one memory storing instructions that, when executed by the at least one processor, cause the apparatus at least to: receive, from a network entity, an indication indicating a set of resource blocks outside a measurement gap of a terminal device; and transmit, to the network entity, information relating to channel occupancy on the set of resource blocks.

In another example aspect of the disclosure, there is a method comprising: receiving, at a network device and from a network entity, an indication indicating a set of resource blocks outside a measurement gap of a terminal device; and transmitting, by the network device and to the network entity, information relating to channel occupancy on the set of resource blocks.

A further example embodiment is an apparatus and a method comprising the apparatus and the method of the previous paragraphs, wherein the channel occupancy on the set of resource blocks indicates traffic of one or more terminal devices scheduled by the apparatus on the set of resource blocks, and wherein the information comprises at least one of: information indicative of locations of the one or more terminal devices, or traffic direction for the traffic of the one or more terminal devices scheduled by the apparatus on the set of resource blocks, or at least one of transmit power or link quality associated with the traffic of the one or more terminal devices scheduled by the apparatus on the set of resource blocks, or identities of the one or more terminal devices, wherein there is receiving, from the network entity, a transmission power per positioning reference signal resource, wherein there is receiving, from the terminal device, a request for a positioning processing window, wherein there is receiving from the terminal device, information indicating at least one of usage of the at least one physical resource blocks for a transmission of the positioning reference signal or a request for a positioning processing window, wherein there is, transmitting, to the terminal device, a configuration of the positioning processing window, in response to the request, and wherein the apparatus comprises a network device and/or the network entity comprises a location management entity.

A non-transitory computer-readable medium storing program code, the program code executed by at least one processor to perform at least the method as described in the paragraphs above.

In another example aspect of the disclosure, there is an apparatus comprising: means for receiving, from a network entity, an indication indicating a set of resource blocks outside a measurement gap of a terminal device; and means for transmitting, to the network entity, information relating to channel occupancy on the set of resource blocks.

In accordance with the example embodiments as described in the paragraph above, at least the means for receiving and transmitting comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
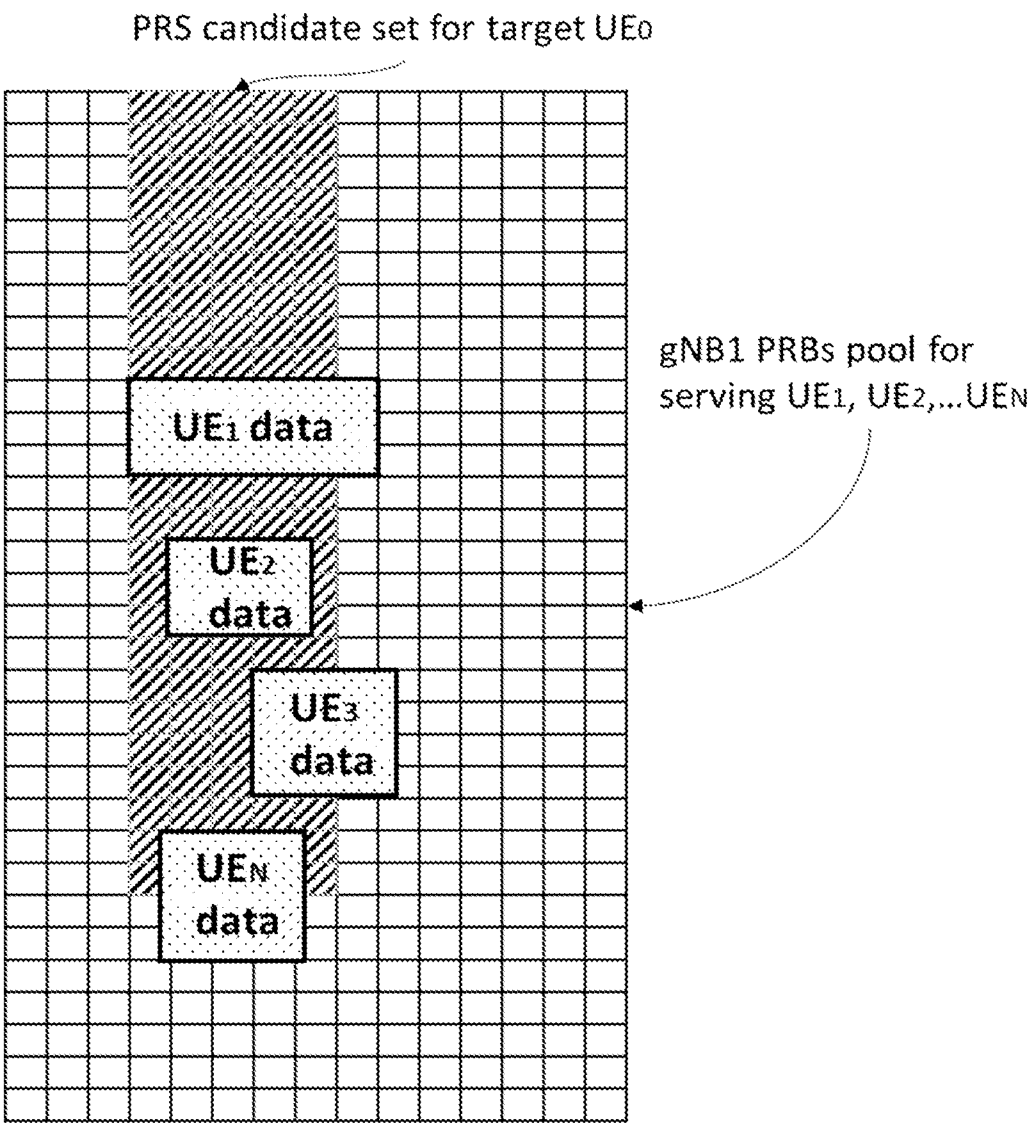
FIG. 1 shows a use-case scenario.

In this disclosure, there is proposed enhancements of LTE Positioning and new radio positioning protocols that enables measurement gap-less positioning reference signal transmission.

As stated above, in standards around the time of this application it was agreed that the UE can measure the positioning reference signals (PRS) without a measurement gap (MG) i.e., perform what is called MG-less PRS measurement.

Also, to measure the PRS without a MG it was agreed to have some conditions for:

1. when the UE can measure and
2. which TRP(s) the UE should measure, and
3. a PRS processing window.

In other words, the TRPs may all send their PRS within the UE PRS processing window (PPW) of a UE, so that the target UE may measure the PRS without requesting and waiting for a MG allocation.

In standards agreements around the time of this application at least the following parameters for PRS processing window from the gNB to the UE are supported:

Starting slot;

Periodicity;

Duration/length; and

Cell and SCS information associated with the above parameters.

In standards around the time of this application includes an additional work item for further positioning enhancements and with even stricter positioning accuracies targeted (e.g., Improved accuracy, integrity, and power efficiency) has begun.

MG-less PRS transmission to a target UE requires that the PRS are sent on PRBs which the UE can measure without requesting an MG from its serving cell; this implies that the PRS should be sent within the target UE's operating band i.e., LMF needs to ensure that the PRB resources from the serving gNB which are used to configure PRS transmission from other (non-serving) TRPs are within the UE's current BWP. How the LMF ensures the selection such PRBs is an open problem and does not have a straightforward solution since the LMF is not aware which PRBs/BWP the serving gNB is using and for which UEs, and thus, the LMF may either:

1. Act opportunistically and assign PRS onto PRBs which are already occupied by serving cell traffic i.e., used for serving communication UEs. In this case, depending on the distance between the target UE and the communication UEs, two situations may occur:
   a. the PRS may end up interfering the serving cell traffic,
   b. The PRS may be interfered by the active DL/UL traffic;
2. Act conservatively and avoid all resources which may be occupied during a given time window, regardless of whether the UEs using said resources are close to the target UE. Accounting for the fact that tens of PRS need to be scheduled, this approach is expected to introduce unacceptable latencies (e.g., target latency of 10 ms for IIoT) and to not scale well with the number of simultaneous positioning sessions i.e., target UEs and active TRPs.

To sum up, an opportunistic MG-less PRS allocation by LMF may lead to bidirectional comms-positioning interference, while a conservative allocation introduces unacceptable latencies.

Currently there is a prioritization scheme between PRS and other data channels of the same UE i.e., how the PRS for a given UE should be scheduled in relation to current/future communication traffic of the same UE. The agreement does not describe how to schedule PRS in relation to data traffic of other UEs, served by the same gNB, nor how to manage any potential resulting interference.

In an standards agreement the following options are supported subject to UE capability for priority handling of PRS when PRS measurement is outside MG:

Option 1: UE may indicate support of two priority states:
- State 1: PRS is higher priority than all PDCCH/PDSCH/CSI-RS,
- State 2: PRS is lower priority than all PDCCH/PDSCH/CSI-RS;

Option 2: UE may indicate support of three priority states:
- State 1: PRS is higher priority than all PDCCH/PDSCH/CSI-RS,
- State 2: PRS is lower priority than PDCCH and URLLC PDSCH and higher priority than other PDSCH/CSI-RS,
- Note: The URLLC channel corresponds a dynamically scheduled PDSCH whose PUCCH resource for carrying ACK/NAK is marked as high-priority,
- State 3: PRS is lower priority than all PDCCH/PDSCH/CSI-RS;

Option 3: UE may indicate support of single priority state:
- State 1: PRS is higher priority than all PDCCH/PDSCH/CSI-RS."

NR positioning protocol Annex (NRPPa) may be used for exchanging information between a reference source (access node and/or BS and/or TP and/or NG-RAN node) and a location server. NRPPa may provide the following functions: E-CID Location Information Transfer. This function allows or implements exchange of location information between a reference source and an LMF, for the purpose of E-CID positioning. OTDOA Information Transfer. This function allows or implements exchange of information between the reference source and the LMF for the purpose of OTDOA positioning. Reporting of General Error Situations. This function allows or implements reporting of general error situations, for which function specific error messages have not been defined.

An LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signals through the LPP.

In example embodiments proposed herein there is a set of enhancements of the LPP and NRPPa protocols that:

Enables the MG-less PRS allocation and PRS power control by the LMF,

Enables the successful PRS detection by the target UE, and

Ensures that no communication link is disturbed in the process.

The example embodiments as disclosed herein work to improve at least these operations with new operations including an exchange of new information elements.

Figure 3:
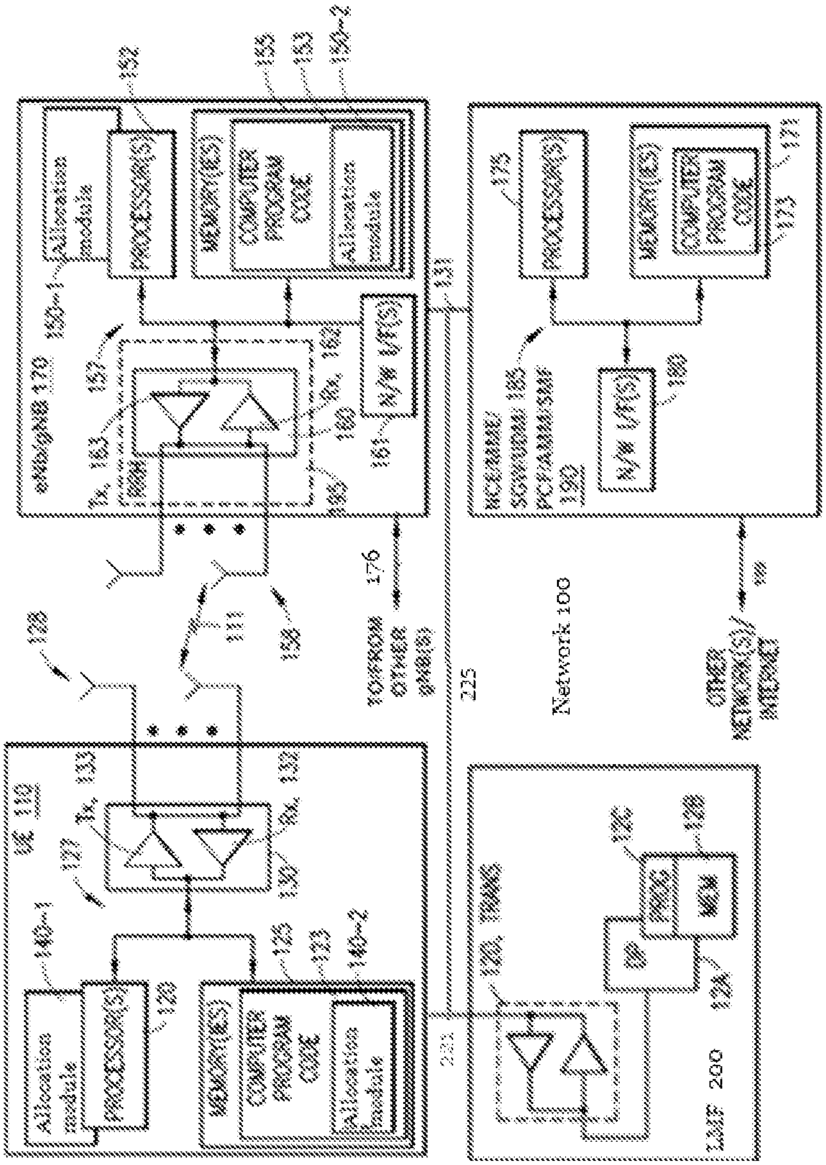
FIG. 3 shows a high-level block diagram of various devices used in carrying out various aspects of the example embodiments as disclosed herein.

Before describing the example embodiments in detail, reference is made to FIG. 3 for illustrating a simplified block diagram of various electronic devices that are suitable for use in practicing the example embodiments of this disclosure.

Before describing the example embodiments of the disclosure in further detail reference is made to FIG. 3. FIG. 3 shows a block diagram of one possible and non-limiting exemplary system in which the exemplary embodiments may be practiced.

As shown in FIG. 3, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Allocation module 140 which is configured to perform the example embodiments of the disclosure as described herein. The Allocation module 150 may be implemented in hardware by itself of as part of the processors and/or the computer program code of the UE 110. The Allocation module 140 comprising one of or both parts 140-1 and/or 140-2, which may be implemented in a number of ways. The Allocation module 140 may be implemented in hardware as Allocation module 140-1, such as being implemented as part of the one or more processors 120. The Allocation module 140-1 may be implemented also as an integrated circuit or through other hardware such as a programmable gate array. In another example, the Allocation module 140 may be implemented as Allocation module 140-2, which is implemented as computer program code 123 and is executed by the one or more processors 120. Further, it is noted that the Allocation modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111 and the LMF 200 via link 221.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an Allocation module 150 which is configured to perform example embodiments of the disclosure as described herein. The Allocation module 150 may comprise one of or both parts 150-1 and/or 150-2, which may be implemented in a number of ways. The Allocation module 150 may be implemented in hardware by itself or as part of the processors and/or the computer program code of the gNB 170. Allocation module 150-1, such as being implemented as part of the one or more processors 152. The Allocation module 150-1 may be implemented also as an integrated circuit or through other hardware such as a programmable gate array. In another example, the Allocation module 150 may be implemented as Allocation module 150-2, which is implemented as computer program code 153 and is executed by the one or more processors 152. Further, it is noted that the Allocation modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176, 221, and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a NCE/MME/SGW/UDM/PCF/AMM/SMF 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the disclosure in any of an LTE, NR, 5G and/or any standards-based communication technologies being performed or discussed at the time of this application.

The gNB 170 is coupled via a link 131 to the NCE/MME/SGW 190 and via link 131 and link 225 to the LMF 200. The link 131 or link 225 may be implemented as, e.g., an S1 interface. The NCE/MME/SGW 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW 190 to perform one or more operations. In addition, the NCE/MME/SGW 190, as are the other devices, is equipped to perform operations of such as by controlling the UE 110 and/or gNB 170 for 5G and/or NR operations in addition to any other standards operations at the time of this application.

The LMF 200 (NR/5G Node B, an evolved NB, or LTE device) is a network node such as a node including a location management function device (e.g., for NR or LTE long term evolution) that communicates with devices such the eNB/gNB 170 and UE 10 of FIG. 3. The LMF 200 provides access to wireless devices such as the UE 10 to the wireless network 1. The LMF 200 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments. Each of the one or more transceivers TRANS 12D includes a receiver and a transmitter. The one or more transceivers TRANS 12D can be optionally connected to one or more antennas for communication over at least link 221 with the UE 110. The one or more memories MEM 12B and the computer program code PROG 12C are configured to cause, with the one or more processors DP 12A, the LMF 200 to perform one or more of the operations as described herein. The LMF 200 may communicate with the gNB or eNB 170 such as via link 225 and 131. Further, the link 221, 225, or 131 and/or any other link may be wired or wireless or both and may implement, e.g., an X2 or Xn interface. Further the link 221, 225, or 131 and may be through other network devices such as, but not limited to an NCE/MME/SGW/UDM/PCF/AMF/SMF/LMF 14 device as in FIG. 3. The LMF 200 may perform functionalities of an MME (Mobility Management Entity) or SGW (Serving Gateway), such as a User Plane Functionality, and/or an Access Management functionality for LTE and similar functionality for 5G.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW 190 as in FIG. 3.

It is noted that functionality(ies), in accordance with example embodiments of the disclosure, of any devices as shown in FIG. 3 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 3 at least via the wireless link 111 and/or via the NCE/MME/SGW 190 using link 199 to Other Network(s)/Internet as in FIG. 3.

In general, various embodiments of any of these devices can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Further, the various embodiments of any of these devices can be used with a UE vehicle, a High-Altitude Platform Station, or any other such type node associated with a terrestrial network or any drone type radio or a radio in aircraft or other airborne vehicle or a vessel that travels on water such as a boat.

In accordance with example embodiments as disclosed herein there proposed to introduce at least the following new IE:

1. An NRPPa IE exchange between LMF and the gNB about a PRB set which is also a candidate for MG-less PRS transmission for one/more target UEs:
   a. The information is about whether the candidate set:
      i. is used for UL or DL,
      ii. If used for UL, what is the UL TX power, and/or
      iii. If used for DL, what is the DL RX power (e.g., measured SINR, RSRP).
      iv. The measured SINR, RSRP can be as measured by the intended recipient of the DL.

In addition, coarse location information about the UL/DL UEs is also exchanged. This course location information may be given as cell sector, or gNB beam index, etc. This enables the LMF to assess whether the Uu traffic and PRS transmission may interfere each other due to proximity of the UEs. For example, when the candidate set is occupied by UL traffic coming from cell-edge UEs, then the TX power on the candidate PRBs is expected to be high, and therefore are likely interfere the PRS reception of a nearby target UE:

2. An LPP IE exchange between the LMF and the target UE about measuring and reporting the channel occupancy of the candidate PRB set:
   a. Such measurement would determine the level of interference that the UE is seeing at the candidate PRB set. The UE may use a threshold to determine if the interference is too large for PRS reception or the UE may directly indicate the level of interference to the LMF.
      i. The measurement can be of an expected interference, since the UE may not be not receiving anything there yet, but only measuring current activity.
      ii. The measurement may also indicate if the interference is constant across all REs within the PRBs or if some REs have less interference from UE point of view. In this case the UE may indicate a preferred comb pattern to the LMF;
   b. The measurement report may be then used by the LMF to down-select the PRBs for PRS transmission and select a TX power of said PRS, where such selections are also indicated to the UE via an LPP IE in accordance with the example embodiments as disclosed herein.
3. An RRC IE exchange between the target UE and the gNB regarding requesting and configuring the PPW for receiving PRS on some/all of the PRBs in the candidate set.

Specifically, the newly proposed LPP and NRPPa IE enable an LMF behaviour in accordance with the example embodiments as disclosed herein to:

Classify whether a PRB set outside the MG of the target UE is a good candidate for PRS transmission/reception. Note that a good candidate resource is one that appears as unoccupied (e.g., minimal interference or negligible RX power) at the target UE side;

Assign the candidate PRB set for a PRS transmission with variable TX power (as opposed to the standard full-power TX approach) to avoid the situation in which the PRS interferes the communication link of a Uu UE. The PRS resources for which variable TX power is applied are flagged and communicated to the gNB which can further optimize the data traffic scheduling.

Assume that the candidate PRB set for PRS transmission overlaps with the spectrum used by gNB 1 which serves UE 1, 2, . . . , N. As a result of this selection, three scenarios may occur:

Scenario A:

Target UE is nearby one/more Uu UEs,

The one or more Uu UEs are UL with TX power>TH1.

In this case, it is expected that the target UEO will experience low quality PRS reception due to high Uu interference;

Scenario B:

Target UE nearby one/more Uu UEs,

The one or more Uu UEs are DL with SINR/RSRP<TH2.

In this case, it is expected that one/more of the Uu UEs experience low Uu traffic quality due to PRS interference;

Scenario C: Target UE far from all Uu UEs. In this case, the Uu and PRS transmissions do not interfere each other.

Figure 2:
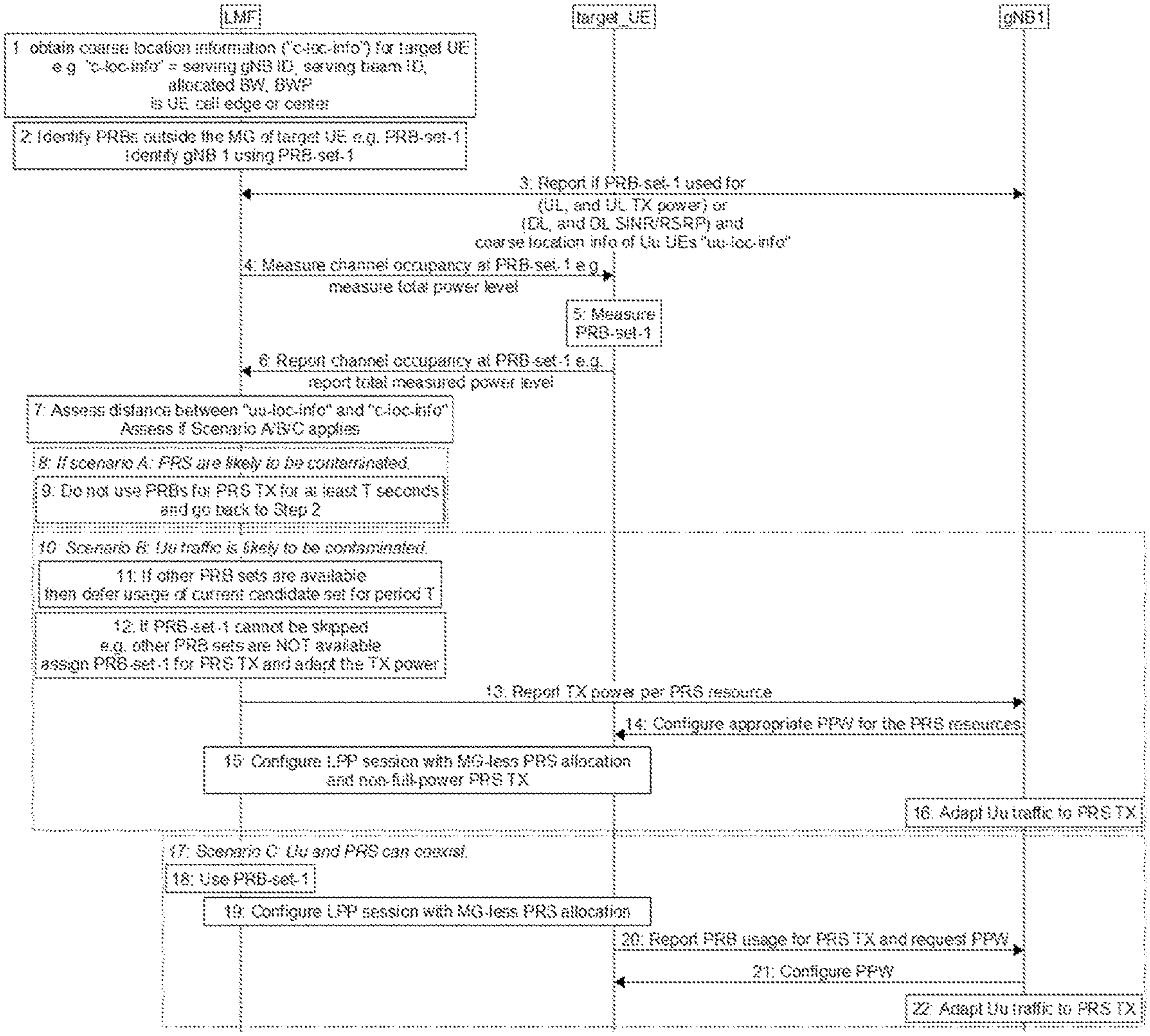
FIG. 2 shows proposed signalling in accordance with example embodiments as disclosed herein.

The flowchart from FIG. 2 describes how the procedure is implemented depending on whether Scenarios A, B or C apply.

As shown in FIG. 2. Specifically, the procedure is triggered by the LMF which obtains the coarse location of the target UE (i.e., "c-loc-info").

As shown in FIG. 2 the LMF and the gNB1 communicate a NRPPa IE in accordance with the example embodiments as disclosed herein with reports if PRB-set 1 used for (UL and UL TX power) or (DL and DL SINR/RSRP) and coarse location information of Uu UEs "uu-loc-info". An IE LPP in accordance with the example embodiments as disclosed herein to measure channel occupancy is sent from the LMF to the target UE at PRB-set-1 to for example measure total power level. Then the target UE responds to the LMF with an IE LPP Report in accordance with the example embodiments as disclosed herein to report channel occupancy at PRB-set-1 for example to report total measured power level. It is noted that an average power level per PRB or a ranked PRB list ordered by their RX power may also be provided. These are straightforward variants.

The LMF selects a candidate PRB set for PRS transmission and requests gNB1 to report info on the Uu traffic scheduled for these candidate PRBs (message 3). Message 3 may be an IE in accordance with the example embodiments as disclosed herein sent over NRPPa Request/Response and may contain information about:

The traffic direction: UL, DL,

The TX power and/or link quality e.g., SINR,

UE IDs, and

UEs coarse location info: "uu-loc-info"

Following, the LMF request the target UE via message 4 (e.g., LPP Measurement Report IE in accordance with example embodiments as disclosed herein), to measure the candidate set. Upon reception of the measurement report (via message 6), the LMF assesses whether Scenarios A, B or C apply by testing the closeness between "uu-loc-info" and "c-loc-info" (block 7).

As shown in FIG. 2 the LMF reports to the gNB1 TX power per PRS resource. The gNB1 configures the target UE with an appropriate PPW for the PRS resources. Then the LMF and the target UE configure an LPP session with MG-less PRS allocation a non-full-power PRS TX.

In FIG. 2 the target UE communicates with the gNB1 PRB usage for PRS TX and request PPW, and the gNB1 communicates with the target UE a PPW configuration.

In a scenario A, the LMF may decide to defer usage of the candidate PRBs for at least T seconds, after which the Uu traffic is expected to be finalized.

A resource block (RB) is a smallest unit of resources that can be allocated to a user. Resource blocks are made up of one slot in a time domain and 12 sub-carrier in a frequency domain. Reference to deferring usage of resource blocks in this paper is related to selecting alternative resource block resources later in time than a current selected set of resource blocks.

In a scenario B, when the candidate PRBs cannot be skipped (due to lack of resources), the LMF implements a PRS control scheme (instead of the standard full power PRS TX). Specifically, the LMF selects a PRS TX power and informs gNB1 about the PRS usage. Subsequently, gNB1 configures the PPW for the target UE (via message 14) and also adapts or adjusts the Uu traffic to cope with the subsequent PRS interference (block 16). The LMF can now deploy the LPP session with non-full-power PRS transmission (message 15).

In a scenario C, the target UE needs only to inform gNB1 about the PRS usage and request the corresponding PPW (message 20). The message may also indicate that the target UE has assessed that the PRS and Uu traffic does not interfere each other (as a result of processing in block 5). Subsequently, gNB1 configures the corresponding PPW.

Figure 4A:
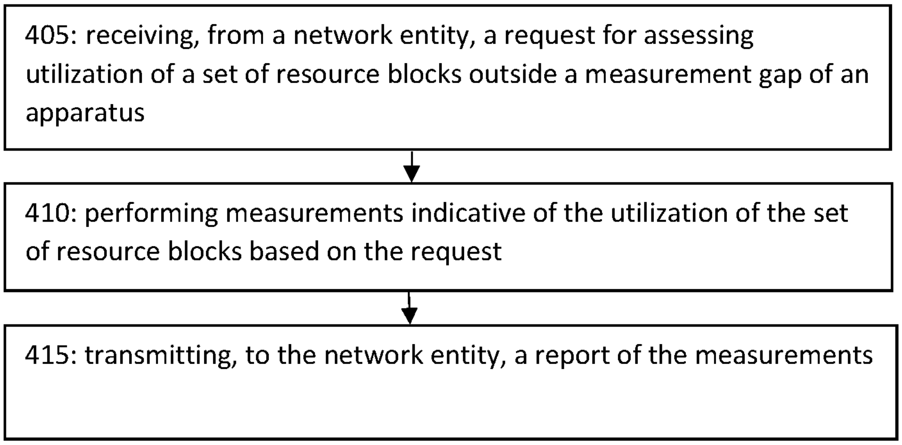
FIG. 4*a*, FIG. 4*b*, and FIG. 4*c* each show a method in accordance with example embodiments as disclosed herein which may be performed by an apparatus.
Figure 4B:
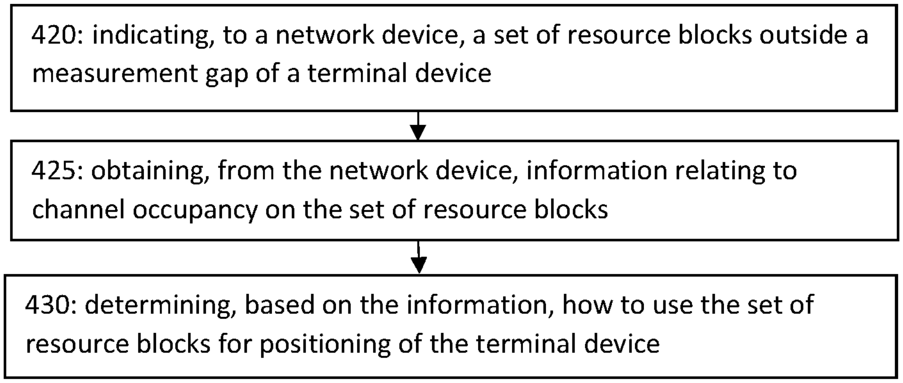
Figure 4C:
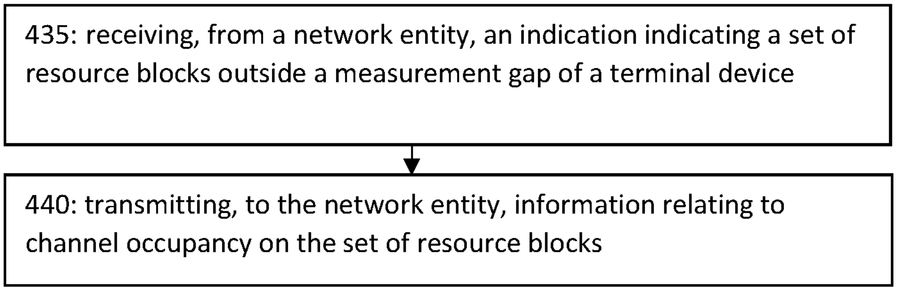

FIG. 4*a* and FIG. 4*b* and FIG. 4*c* each show a method in accordance with example embodiments of the disclosure which may be performed by an apparatus. As shown in step 410 of FIG. 4*a* there is receiving, from a network entity, a request for assessing utilization of a set of resource blocks outside a measurement gap of an apparatus. As shown in step 410 of FIG. 4*a* there is performing measurements indicative of the utilization of the set based on the request. Then as shown in step 415 of FIG. 4*a* there is transmitting, to the network entity, a report of the measurements.

In accordance with the example embodiments as described in the paragraph above, wherein the apparatus is further caused to: receive, from the network entity, information indicating how to use the set of resource blocks for positioning of the apparatus.

In accordance with the example embodiments as described in the paragraphs above, wherein the apparatus is further caused to: defer, based on the information, usage of the set of resource blocks for the positioning of the apparatus.

In accordance with the example embodiments as described in the paragraphs above, wherein there is obtaining a positioning processing window; and receiving, a positioning reference signal on at least one physical resource block of the set of resource blocks within the positioning processing window.

In accordance with the example embodiments as described in the paragraphs above, wherein the positioning processing window is configured by a network device for the apparatus.

In accordance with the example embodiments as described in the paragraphs above, wherein the apparatus is further caused to: transmit, to the network device, a request for the positioning processing window.

In accordance with the example embodiments as described in the paragraphs above, wherein there is transmitting information indicating at least one of usage of the at least one physical resource blocks for a transmission of the positioning reference signal or a request for the positioning processing window.

In accordance with the example embodiments as described in the paragraphs above, wherein there is receiving, from the network device, a configuration of the positioning processing window, in response to the request.

In accordance with an example embodiment of the disclosure as described above, wherein the apparatus comprises a terminal device and/or the network entity comprises a location management entity.

A non-transitory computer-readable medium (Memory(ies) 125 as in FIG. 3) storing program code (Computer Program Code 123 and/or Allocation module 140-2 as in FIG. 3), the program code executed by at least one processor (Processor(s) 120 and/or Allocation module 140-1 as in FIG. 3) to perform the operations as at least described in the paragraphs above.

In accordance with an example embodiment of the disclosure as described above, there is an apparatus comprising: means for receiving (one or more transceivers 130, Memory(ies) 125, Computer Program Code 123 and/or Allocation module 140-2, and Processor(s) 120 and/or Allocation module 140-1 as in FIG. 3), from a network entity (LMF 200 as in FIG. 3), a request for assessing utilization of a set of resource blocks outside a measurement gap of an apparatus; means for performing (one or more transceivers 130, Memory(ies) 125, Computer Program Code 123 and/or Allocation module 140-2, and Processor(s) 120 and/or Allocation module 140-1 as in FIG. 3) measurements indicative of the utilization of the set based on the request; and means for transmitting (one or more transceivers 130, Memory(ies) 125, Computer Program Code 123 and/or Allocation module 140-2, and Processor(s) 120 and/or Allocation module 140-1 as in FIG. 3), to the network entity, a report of the measurements.

In the example aspect according to the paragraph above, wherein at least the means for receiving, performing, and transmitting comprises a non-transitory computer readable medium [Memory(ies) 125 as in FIG. 3] encoded with a computer program [Computer Program Code 123 and/or Allocation module 140-2 as in FIG. 3] executable by at least one processor [Processor(s) 120 and/or Allocation module 140-1 as in FIG. 3].

FIG. **4*b* illustrates operations which may be performed by a network entity such as, but not limited to, a network entity (e.g., the LMF 200 as shown in FIG. 3). As shown in step 420 of FIG. 4*b* there is indicating, to a network device, a set of resource blocks outside a measurement gap of a terminal device. As shown in step 425 of FIG. 4*b* there is obtaining, from the network device, information relating to channel occupancy on the set of resource blocks. Then as shown in step 430 of FIG. 4*b*** there is determining, based on the information, how to use the set of resource blocks for positioning of the terminal device.

In accordance with the example embodiments as described in the paragraph above, wherein the channel occupancy on the set of resource blocks indicates traffic of one or more terminal devices scheduled by the network device on the set of resource blocks.

In accordance with the example embodiments as described in the paragraphs above, wherein the information comprises at least one of the followings: information indicative of locations of the one or more terminal devices, or traffic direction for the traffic of the one or more terminal devices scheduled by the network device on the set of resource blocks, or transmit power and/or link quality associated with the traffic of one or more terminal devices scheduled by the network device on the set of resource blocks, or identities of the one or more terminal devices.

In accordance with the example embodiments as described in the paragraphs above, wherein there is requesting the terminal device to perform measurements on the set of resource blocks.

In accordance with the example embodiments as described in the paragraphs above, wherein there is receiving, from the terminal device, a report of the measurements.

In accordance with the example embodiments as described in the paragraphs above, wherein there is deferring, based on the report, usage of the set of resource blocks for the positioning of the terminal device.

In accordance with the example embodiments as described in the paragraphs above, wherein there is allowing or implementing, based on the report, partial utilization of the set of resource blocks comprising lowering transmit power or using a subset of the set of resource blocks for the positioning of the terminal device.

In accordance with the example embodiments as described in the paragraphs above, wherein there is allowing or implementing, based on the report, full power transmissions on the set of resource blocks for the positioning of the terminal device.

In accordance with the example embodiments as described in the paragraphs above, wherein there is transmitting, to the network device, a transmission power per positioning reference signal resource.

In accordance with the example embodiments as described in the paragraphs above, wherein the apparatus comprises a location management entity.

A non-transitory computer-readable medium (MEM 12B as in FIG. 3) storing program code (PROG 12C as in FIG. 3), the program code executed by at least one processor (DP 12A as in FIG. 3) to perform the operations as at least described in the paragraphs above.

In accordance with an example embodiment of the disclosure as described above there is an apparatus comprising: means for indicating (TRANS 12D, MEM 12B, PROG 12C, and DP 12A as in FIG. 3), to a network device (NN 13 as in FIG. 3), a set of resource blocks outside a measurement gap of a terminal device; means for obtaining (TRANS 12D, MEM 12B, PROG 12C, and DP 12A as in FIG. 3), from the network device, information relating to channel occupancy on the set of resource blocks; Then means for determining (TRANS 12D, MEM 12B, PROG 12C, and DP 12A as in FIG. 3), based on the information, how to use the set of resource blocks for positioning of the terminal device.

In the example aspect according to the paragraph above, wherein at least the means for indicating, obtaining, and determining comprises a non-transitory computer readable medium [MEM 12B as in FIG. 3] encoded with a computer program [PROG 12C as in FIG. 3] executable by at least one processor [DP 12A as in FIG. 3].

FIG. **4*c* illustrates operations which may be performed by a device such as, but not limited to, a network device (e.g., the NN 200 or a gNB as shown in FIG. 3). As shown in step 435 there is receiving, from a network entity, an indication indicating a set of resource blocks outside a measurement gap of a terminal device. Then as shown in step 440 of FIG. 4***c* there is transmitting, to the network entity, information relating to channel occupancy on the set of resource blocks.

In accordance with the example embodiments as described in the paragraph above, wherein the channel occupancy on the set of resource blocks indicates traffic of one or more terminal devices scheduled by the apparatus on the set of resource blocks.

In accordance with the example embodiments as described in the paragraphs above, wherein the information comprises at least one of the followings: information indicative of locations of the one or more terminal devices, or traffic direction for the traffic of the one or more terminal devices scheduled by the apparatus on the set of resource blocks, or transmit power and/or link quality associated with the traffic scheduled by the apparatus on the set of resource blocks, or identities of the one or more terminal devices.

In accordance with the example embodiments as described in the paragraphs above, wherein there is receiving, from the network entity, a transmission power per positioning reference signal resource.

In accordance with the example embodiments as described in the paragraphs above, wherein there is receiving, from the terminal device, a request for a positioning processing window.

In accordance with the example embodiments as described in the paragraphs above, wherein there is receiving from the terminal device, information indicating at least one of usage of the at least one physical resource blocks for a transmission of the positioning reference signal or a request for a positioning processing window.

In accordance with the example embodiments as described in the paragraphs above, wherein there is, transmitting, to the terminal device, a configuration of the positioning processing window, in response to the request.

In accordance with the example embodiments as described in the paragraphs above, wherein the apparatus comprises a network device and/or the network entity comprises a location management entity A non-transitory computer-readable medium (Memory(ies) 155 and/or Allocation module 150-2 as in FIG. 3) storing program code (Computer Program Code 155 as in FIG. 3), the program code executed by at least one processor (Processor(s) 152 and/or Allocation Module 150-1 as in FIG. 3) to perform the operations as at least described in the paragraphs above.

In accordance with an example embodiment of the disclosure as described above there is an apparatus comprising: means for receiving (one or more transceivers 160, Memory(ies) 155, Computer Program Code 155 and/or Allocation module 150-2, and Processor(s) 152 and/or Allocation module 150-1 as in FIG. 3), from a network entity (LMF 200 as in FIG. 3), an indication indicating a set of resource blocks outside a measurement gap of an apparatus; and means for transmitting (one or more transceivers 160, Memory(ies) 155, Computer Program Code 155 and/or Allocation module 150-2, and Processor(s) 152 and/or Allocation module 150-1 as in FIG. 3), to the network entity, information relating to channel occupancy on the set of resource blocks.

In the example aspect according to the paragraph above, wherein at least the means for receiving and transmitting comprises a non-transitory computer readable medium [Memory(ies) 155 and/or Allocation module 150-2 as in FIG. 3] encoded with a computer program [Computer Program Code 155 as in FIG. 3] executable by at least one processor [Processor(s) 152 and/or Allocation module 150-1 as in FIG. 3].

Further, in accordance with example embodiments of the disclosure there is circuitry for performing operations in accordance with example embodiments of the disclosure as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the disclosure as described herein.

In accordance with example embodiments of the disclosure as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions, such as functions or operations in accordance with example embodiments of the disclosure as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the disclosure and not to limit the scope of the disclosure which is defined by the claims.

The foregoing description has provided by way of exemplary and non-limiting examples a full and informative description of the best method and apparatus presently contemplated by the inventors for carrying out the disclosure. However, various modifications and adaptations or adjustments may become apparent to those skilled in the relevant arts in view of the foregoing description, when read in conjunction with the accompanying drawings and the appended claims. However, all such and similar modifications of the teachings of this disclosure will still fall within the scope of this disclosure.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this disclosure could be used to advantage without the corresponding use of other features. As such, the foregoing description should be considered as merely illustrative of the principles of the disclosure, and not in limitation thereof.

What is claimed is:

1. An apparatus comprising:

at least one processor; and at least one memory storing instructions that, when executed by the at least one processor, cause the apparatus at least to:

receive, from a network entity, via a Long Term Evolution Positioning Protocol information element, a request for assessing utilization of a set of resource blocks outside a measurement gap of the apparatus, wherein the set of resource blocks comprises a candidate physical resource block set for measurement-gap-less positioning reference signal transmission within a current bandwidth part of the apparatus;

perform measurements indicative of the utilization of the set of resource blocks based on the request, wherein the measurements comprise a channel-occupancy measurement of the candidate physical resource block set including a total measured power level, an average power level per physical resource block, and a ranked physical resource block list ordered by received power;

transmit, to the network entity, a report of the measurements, wherein the report indicates channel occupancy at the candidate physical resource block set for use by the network entity in down-selecting physical resource blocks for the positioning reference signal transmission;

receive, from the network entity, information indicating how to use the set of resource blocks for positioning of the apparatus, wherein the information is based at least on whether the candidate physical resource block set appears unoccupied at the apparatus with minimal interference or negligible received power;

based on the information, defer usage of the set of resource blocks for the positioning of the apparatus, or use at least one physical resource block of the set of resource blocks for receiving a positioning reference signal, wherein deferring usage comprises selecting alternative resource block resources later in time than the set of resource blocks when uplink traffic from one or more terminal devices is expected to interfere with reception of the positioning reference signal;

transmit, to a network device, information indicating usage of the at least one physical resource block for a transmission of the positioning reference signal and a request for a positioning processing window, wherein the information further indicates that the apparatus has assessed that positioning reference signal transmission and user-equipment-to-network traffic do not interfere with each other;

receive, from the network device, a configuration of the positioning processing window;

obtain the positioning processing window based on the configuration; and receive the positioning reference signal on the at least one physical resource block of the set of resource blocks within the positioning processing window, wherein the positioning reference signal is received without requesting and waiting for a measurement-gap allocation, wherein the positioning processing window is configured by the network device for the apparatus, and wherein the apparatus comprises a terminal device, the network entity comprises a location management function entity, and the network device comprises a next generation Node B.

* * * * *